(12) United States Patent
Krueger

(10) Patent No.: US 6,971,208 B2
(45) Date of Patent: Dec. 6, 2005

(54) ISOLATION UNIT AND METHOD OF USE FOR SECURING INMATES

(75) Inventor: Todd D. Krueger, Lillington, NC (US)

(73) Assignee: Bob Barker Company, Inc., Fuquay-Varina, NC (US)

( * ) Notice: Subject to any disclaimer, the term of this patent is extended or adjusted under 35 U.S.C. 154(b) by 159 days.

(21) Appl. No.: 10/671,982

(22) Filed: Sep. 25, 2003

(65) Prior Publication Data

US 2005/0066586 A1    Mar. 31, 2005

(51) Int. Cl.$^7$ .............................................. E04H 3/08
(52) U.S. Cl. ...................... 52/106; 52/79.8; 296/24.42
(58) Field of Search ...................... 52/106, 79.8, 64, 52/68, 36.1, 481.2, 239; 296/24.42; 119/473, 119/472, 474, 522, 523

(56) References Cited

U.S. PATENT DOCUMENTS 5,233,939 A * 8/1993 Randolph .................... 119/473
5,890,329 A   4/1999 Krueger

* cited by examiner

Primary Examiner—Naoko Slack
(74) Attorney, Agent, or Firm—Coats & Bennett, P.L.L.C.

(57) ABSTRACT

An isolation cell for transporting inmates, and a method of loading and unloading the inmates from the cell. The isolation cell features a number of separate compartments for holding inmates. Once in the compartments, the inmates are isolated to be out of contact with the other inmates within the cell. A number of interior walls are positioned throughout the cell to form the separate compartments. One or more of the interior walls are movable between first and second positions. In the first positions, the interior walls are moved in a manner for the inmates to be loaded and unloaded from the compartments. In the second positions, the interior walls are locked to complete the compartments and securely isolate the inmates.

23 Claims, 8 Drawing Sheets

ISOLATION UNIT AND METHOD OF USE FOR SECURING INMATES

BACKGROUND

Inmates are often transported between facilities. By way of example, the inmates may need to be transferred from one correctional facility to another. As a minimum requirement, the vehicle, and the unit where the inmates are placed, should prevent the inmates from escaping. Additionally, the inmates may be a danger to each other. Often times inmates are violent and need to be isolated to prevent them from injuring other inmates. The unit should provide for housing at least one inmate in a manner in which they are isolated from the others. The isolation would prevent them from physically contacting the other inmates and thus prevent fights that could result in injuries to the violent inmate and to the other inmates.

The unit should also be designed to allow the inmates to be loaded and unloaded in a convenient manner. The doors should be of adequate size to allow the inmates to be placed within the unit. Additionally, the overall unit should be designed to be accessible for loading the inmates within the isolation unit. In addition to being violent, these persons are usually not happy to be going for a ride and resist being loaded within the unit. The unit should also be designed such that the other inmates are isolated from the violent inmate, even during loading and unloading.

Another concern is providing emergency egress from the unit in the event the vehicle is in an accident. Escape routes should be designed to allow the inmates to be removed from the vehicle in the event that the normal exit routes are not accessible, or the keys to the locks are not available. The design should allow for these routes to be used only during emergencies, and not in any manner prevent a way for the inmates to escape.

Additionally, the unit should be designed to fit within a normal passenger vehicle, such as a cargo van. The unit should be sized to be assembled to fit within the confines of the van in a secure and safe manner. The use of passenger vehicles greater reduces the overall cost of a security vehicle, as specially built security vehicles are often prohibitively expensive.

SUMMARY

The present invention is directed to an isolation cell for transporting inmates, and a method of loading and unloading the inmates from the cell. The isolation cell features a number of separate compartments for holding inmates. Once in the compartments, the inmates are isolated and out of contact with the other inmates within the cell. A number of interior walls are positioned throughout the cell to form the separate compartments.

One or more of the interior walls may be movable between first and second positions. In the first positions, the interior walls are moved in a manner for the inmates to be loaded and unloaded from the compartments. In the second positions, the interior walls are locked to complete the compartments and securely isolate the inmates.

In one embodiment, the cell includes a plurality of exterior doors to facilitate loading and unloading of the inmates. The exterior doors may be on opposite sides of the cell and may each include access into the cell interior. The exterior doors may further include a locking mechanism to securely lock the door in the closed position to prevent escape by the inmates.

The cell may further be modular with each of the individual pieces sized to fit within a vehicle. The cell may be assembled within the vehicle and conform to the vehicle size and dimensions. In one embodiment, the cell includes two exterior doors that align with doors on the vehicle. The cell may be sized to fit within a number of different model passenger vehicles, such as a van.

The cell may further include means for accessing one or more of the compartments in the event of an emergency. It may be necessary to have an alternative method of removing the inmates If the vehicle where to become involved in an emergency and the exterior doors are unable to be opened. In one embodiment, access doors are positioned on the exterior walls leading into one or more compartments. The access doors can be removed from the exterior of the cell to remove the inmates. In one embodiment, the locking mechanism for securing the exterior doors may also feature a breakable section that can be opened from the exterior of the cell to again access the inmates within the cell. In both embodiments, the emergency access means are not accessible by the inmates within the cell, and are only available to use by persons on the outside of the cell, such as emergency personnel.

DETAILED DESCRIPTION

Figure 1:
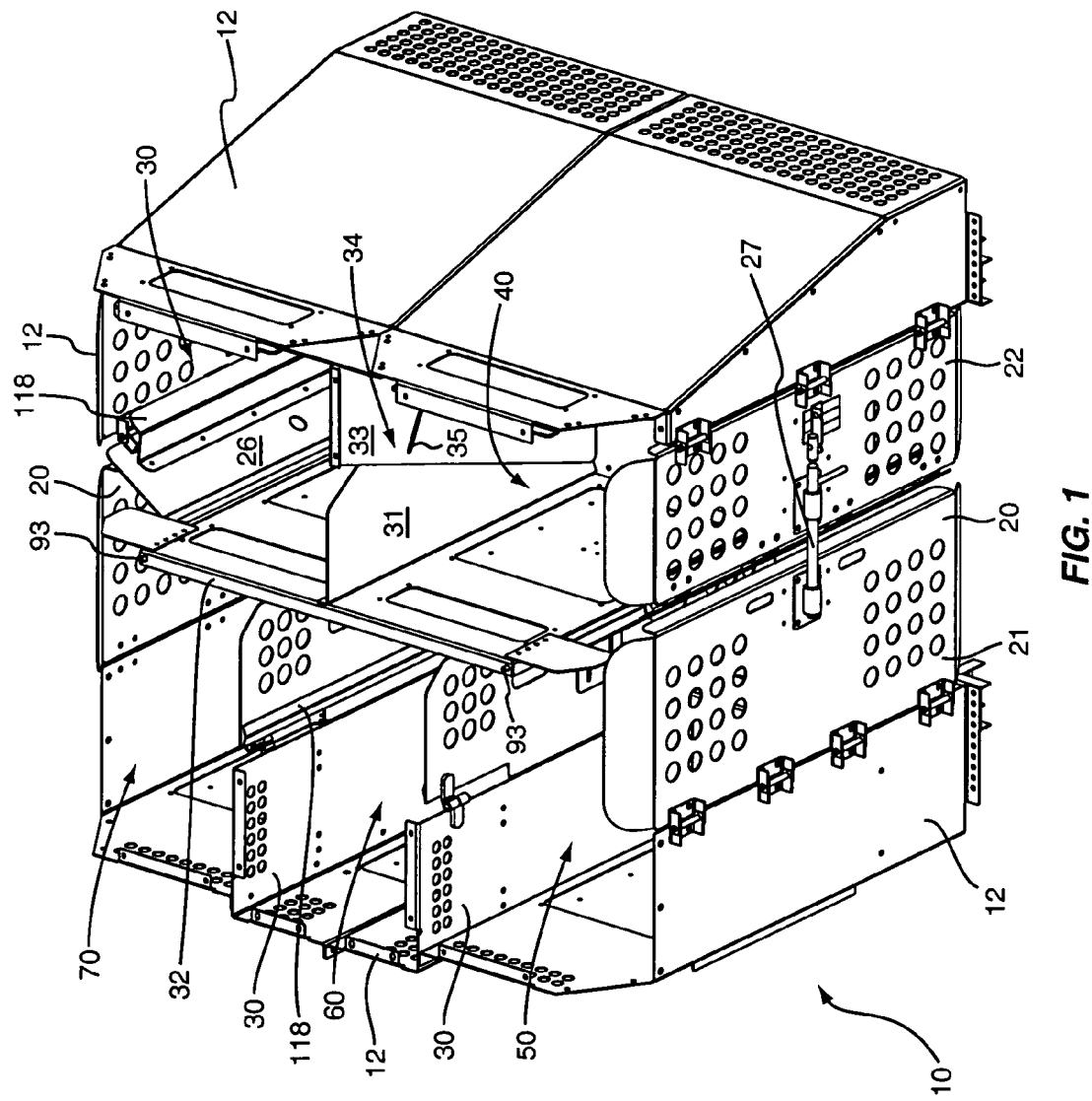
FIG. 1 is a right side perspective view of one embodiment of the isolation unit constructed according to one embodiment of the present invention.

The present invention is directed to an isolation and transporting unit as generally illustrated by numeral 10 in FIG. 1. The unit 10 includes a number of individual compartments 30, 40, 50, 60, 70 for housing inmates. The term compartments 19 will be used for purposes of explanation to define the plurality of compartments 30, 40, 50, 60, 70 within the unit 10. Each of the compartments is enclosed by walls that isolate each inmate and prevent injuring contact from the others. At least one doorway leads into each of the compartments to allow entrance and exit. The compartments are further designed such that the inmates remain isolated from each other during the loading and unloading process.

Figure 2:
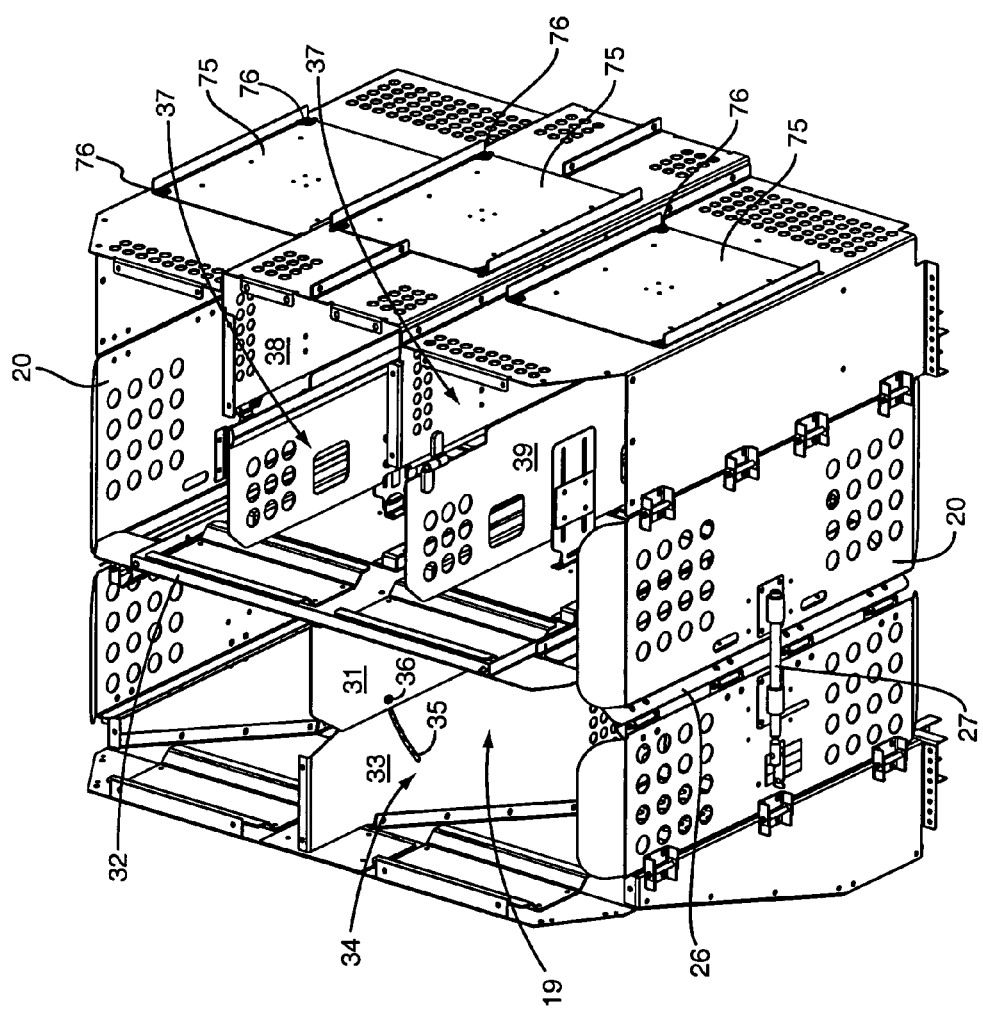
FIG. 2 is a left side perspective view of one embodiment of the isolation unit constructed according to one embodiment of the present invention.

FIGS. 1 and 2 illustrate perspective views of the unit 10. The unit 10 includes an exterior wall 12 that forms the overall shape. One or more interior walls 32, 34, 37 fit within the exterior wall 12 and segregate the interior space laterally and longitudinally. Exterior doors 20 are selectively positionable to provide access to and limit access from the interior of the unit 10.

Exterior wall 12 forms the overall shape and size of the unit 10. In the embodiment illustrated in FIGS. 1 and 2, the exterior walls 12 form a substantially rectangular shape. The exterior wall 12 may be constructed of a single piece, or more may constructed of individual sections that are attached together. The shape and size of the exterior wall 12 is largely dependent upon the specific application, such as the type and model of vehicle in which the unit 10 is contained, the number of inmates to be contained, the amount of time the inmates are to be contained, etc.

Figure 3:
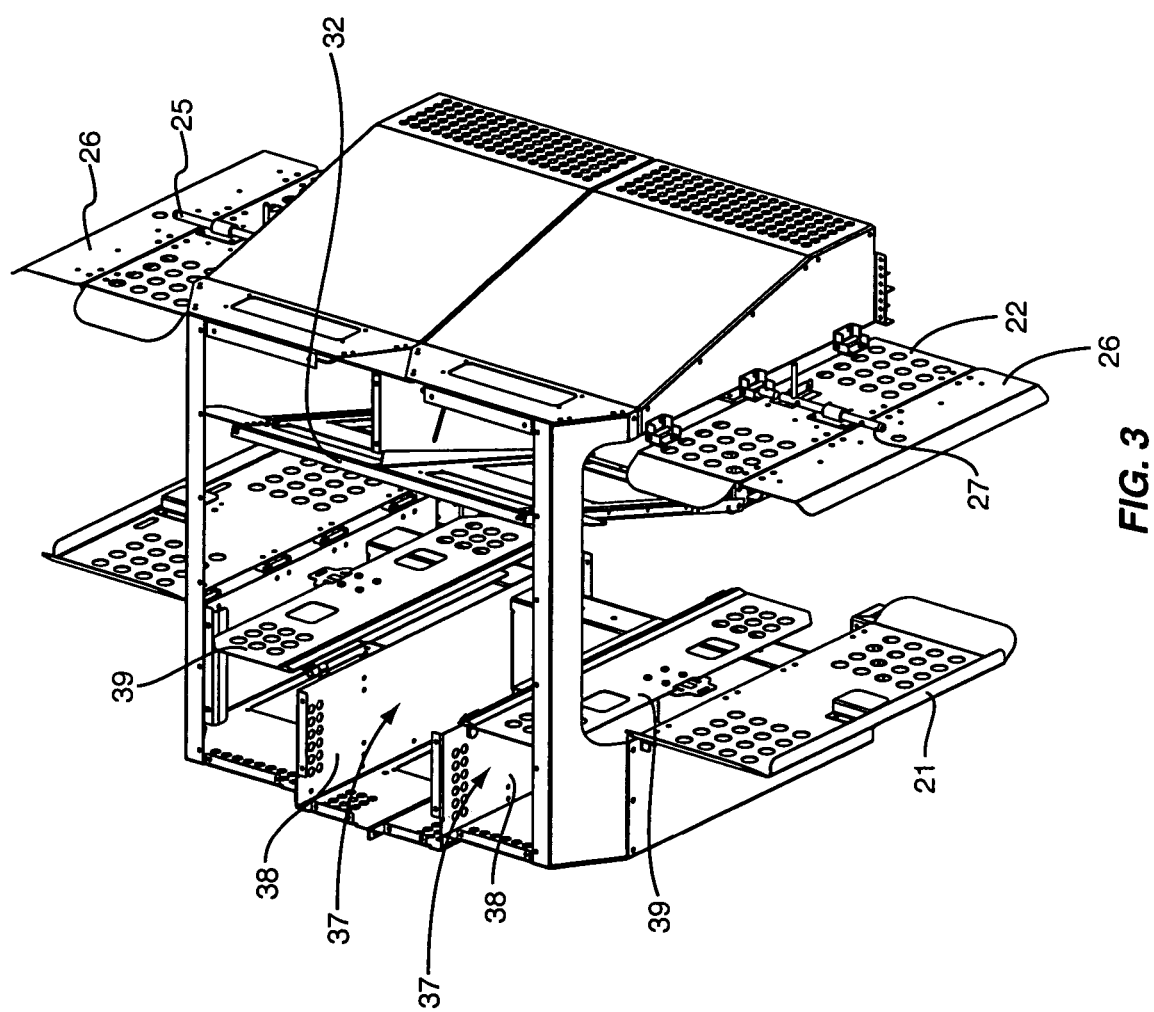
FIG. 3 is another right side perspective view of one embodiment of the isolation unit with the exterior doors open constructed according to one embodiment of the present invention.

One or more exterior doors 20 are mounted on the exterior wall 12. The exterior doors 20 are positionable between an open position as illustrated in FIG. 3 to allow entrance and exit from the unit 10, and a closed position as illustrated in FIGS. 1 and 2 to prevent egress from the unit 10. Various types of exterior doors 20 are applicable to the present invention. In one embodiment, the exterior doors 20 have two parts including a first section 21 and a second section 22. As illustrated in FIG. 3, each section 21, 22 is pivotally mounted to an exterior wall 12 to swing apart from the doorway.

A locking mechanism 25 selectively locks the exterior doors 20 in a closed orientation. Various types of locking mechanisms 25 are applicable to the present invention, including a sliding bar 27 configured to receive a lock. The sliding bar 27 is moved to a first position to open the exterior doors 20, and moved to a second position extending across the doors for locking. The locking mechanism 25 is positioned at a location to be non-accessible by the inmates within the unit 10.

Interior walls are positioned within the exterior wall 12 and separate the unit 10 into compartments 30. The interior walls may be positioned to abut against the exterior wall 12, and other interior walls, or may be sized to have a gap therebetween. The gaps are minimal in size and prevent an inmate from injuriously contacting another inmate in an adjoining compartment 19. The terms "divides", "separates", "extends across" "extends between" and the like are used to describe the position and function of forming the compartments 19 within the exterior wall 12.

Figure 4:
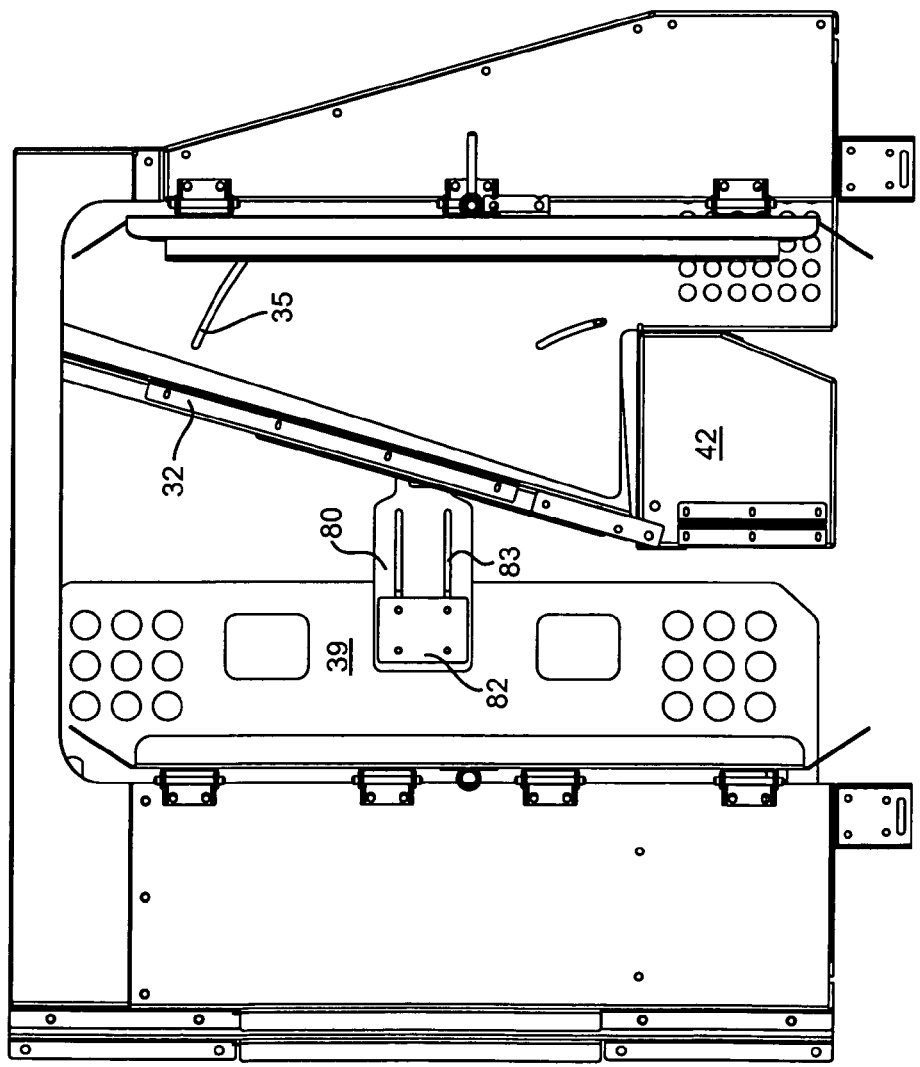
FIG. 4 is a right side view of the first wall in an angled orientation according to one embodiment of the present invention.

A first wall 32 separates the interior space into a first and second section. In one embodiment, first wall 32 separates the unit 10 into a front section and a back section. As illustrated in FIG. 4, first wall 32 is pivotally connected within the unit 10 and movable between upright and angled orientations. FIGS. 3 and 4 illustrate the first wall 32 in the angled orientation. FIGS. 1 and 2 illustrate the first wall 32 in the upright orientation. Moving the first wall 32 to the angled orientation facilitates inmate movement within the rear compartments 50, 60, 70 as will be explained in detail below. In another embodiment (not illustrated), first wall 32 slides within the unit 10 to adjust the position relative to the exterior wall 12. Various other manners of movement may also be used. First wall 32 includes a lock to fix the position. In one embodiment, extension 93 positioned at the upper edge mount within receptacles in the top piece 110 to lock the first wall 32 in the upright position. The same lock, or different locks may also be used for locking the first wall 32 in the angled position.

A second wall 34 extends between the first wall 32 and exterior wall 12 forming compartments 30 and 40. Second wall 34 comprises a first section 31 and a second section 33. In one embodiment, sections 31 and 33 are complimentary such that the wall is collapsible when moving from the upright position to the angled position. Each of the sections 31, 33 includes a complimentary shape, such as a flat surface, that slides together between the positions. As best illustrated in FIG. 2, second wall 34 may further include a complimentary slot 35 and pin 36. The pin 36 slides within the slot 35 when the first wall 32 moves from the upright to the angled orientation. Additional slot and pin combinations may be positioned at other points along the second wall 34.

Third wall 37 divides the rear section of the unit 10 behind the first wall 32. In the embodiment illustrated, two third walls 37 divide the rear section into the three compartments 50, 60, and 70. The third wall 37 is movable between a first orientation extending between the adjacent walls and forming the compartment to enclose the inmate, and a second orientation in which the door is open to allow access into and out of the compartment. By way of examples, FIGS. 1 and 2 illustrate the third walls 37 in a closed orientation in which an inmate within compartment 60 is enclosed. FIGS. 3 and 4 illustrate the third walls 37 in an open orientation.

Third wall 37 may be constructed of a single piece, or from a plurality of pieces. In one embodiment, third wall 37 comprises a first section 38 and a second section 39. One of the sections 38, 39 may be fixedly mounted within the unit 10, or both sections 38, 39 may be movable between open and closed orientations. In the embodiment illustrated in FIG. 3, first section 38 is fixedly mounted within the unit 10, as the second section 39 is pivotally mounted to the first section 38 on one or more hinges.

In the closed orientation, a member 80 locks the third wall 37 to the first wall 32. Member 80 extends outward from the third wall 37 and remains connected to the first wall 32 as it moves between the upright and angled orientations. The member 80 blocks the gap formed between the third wall 37 and first wall 32 when the first wall 32 is pivoted to the angled orientation. An inmate may be able to escape through the gap if the member 80 did not extend outward. The member 80 is connected to the first wall 32 such that the change in angle does not prevent a secure attachment, and does not prevent movement of the first wall 32 between the upright and angled orientations.

Figure 5:
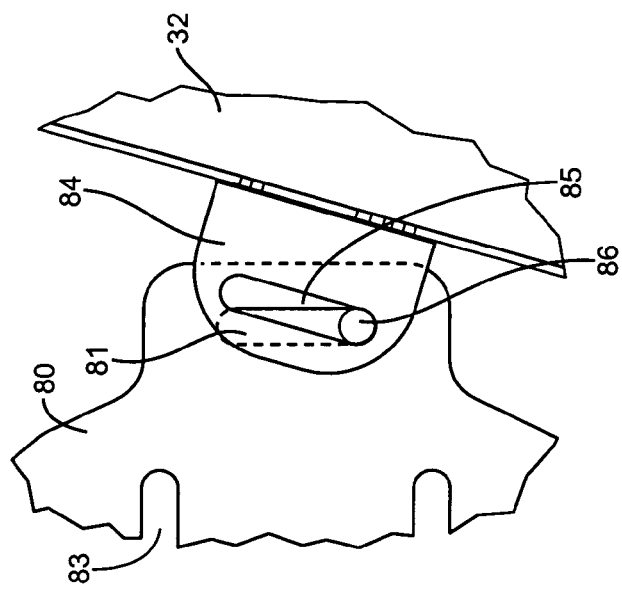
FIG. 5 is a schematic view illustrating the member attached to the first wall according to one embodiment of the present invention.
Figure 6:
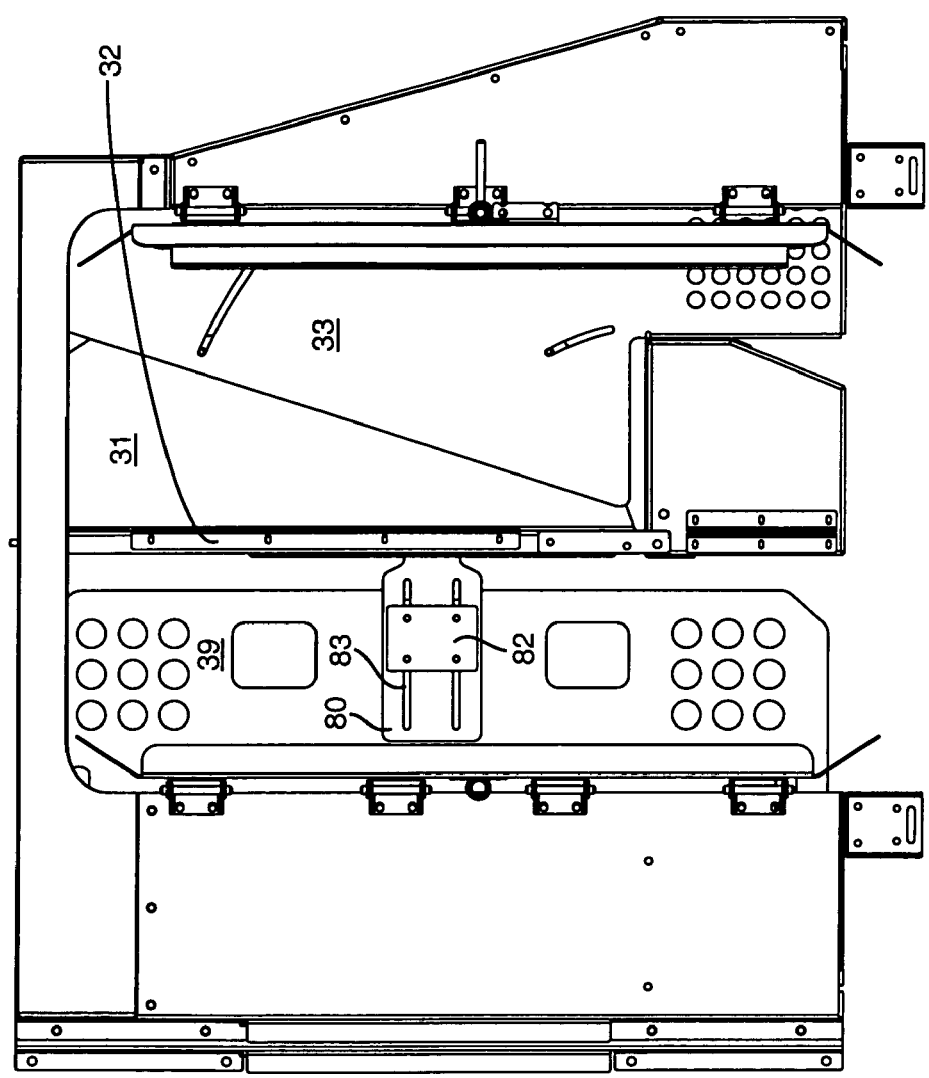
FIG. 6 is a right side view of the first wall in an upright orientation according to one embodiment of the present invention.

One embodiment of the member 80 is illustrated in FIGS. 4 and 5. Member 80 includes an elongated body having at least one slot 83 running along at least a portion of the body. An attachment member 82 connects the member 80 to the third wall 37. An elongated aperture 81 is positioned towards one end of the elongated body. The member 80 aligns with a mount 84 attached to the first wall 32 with the elongated aperture 81 aligning with a corresponding elongated aperture 85 within the mount 84. A lock 86 extends through both apertures 81, 85 and is sized to slide along the length of the apertures 81, 85. As the first wall 32 moves between the upright and angled orientations, the relative alignments of the apertures 81, 85 changes with the lock 86 maintaining the connection. Further, the slots 83 slide relative to the attachment member 82 as illustrated in the comparison of FIG. 4 with the first wall 32 in the angled orientation, and FIG. 6 with the first wall 32 in the upright orientation. The third wall 37 is disconnected from the first wall 32 by removing the lock 86. After unlocking, the third wall 37 can be moved away from the first wall 37 thus allowing access to the compartment 60. The member 80 can be attached when the first wall 32 is either in an angled or upright orientation. In another embodiment, member 80 is pivotally mounted to the third wall 37. The member 80 pivots about one or more fasteners, in addition to sliding along a single slot 83 between extended and retracted positions.

In one embodiment, extensions 26 are mounted to the exterior doors 20. When the doors are in the closed orientation, the extensions 26 extend between the exterior doors 20 and the first wall 32 to close a gap that exists between the edge of the first wall 32 and the exterior doors 20 as illustrated best in FIG. 1. The extension 26 further isolates the inmates within the compartments 19. In the embodiment illustrated, the extension 26 is connected by hinges to one of the exterior doors 20. Various mounting methods may be used to attach the extension 26, or may include the extension being an integral part of the extension doors 26. The extensions 26 may mount to the first wall 32 in a variety of manners provided there is a secure attachment to prevent removal.

In the event of an emergency, it may be necessary for the inmates to be removed from the compartments 19 through routes other than the exterior doors 20. By way of example, if the vehicle 100 is in a wreck and the exterior doors 20 will not open, the inmates would be trapped inside. To prevent this, access doors 75 are mounted on the exterior walls 12 to provide an escape passage from one or more of the compartments 19. The access doors 75 are attached to the exterior walls 12 by one or more connectors 76. In one embodiment, the connectors 76 are clevis pins. The connectors 76 may be non-locking such that they can be opened by rescue personnel in the event of an emergency. If the connectors 76 were locked, they would be more difficult and take more time to remove. The connectors 76 are situated on the outside of the exterior walls to prevent the access to the inmates and prevent any possible escape. In the embodiments illustrated, access doors 75 are positioned on the back exterior wall 12 to access the back compartments 50, 60, 70. More than one access door 75 may lead into a compartment 19, and access doors 75 may further be positioned on the side of exterior wall 12, bottom, and top 110.

In one embodiment, access doors 75 are positioned within the first wall 32 to give emergency access to the front compartments 30, 40. The access doors 75 include connectors 76 that face outward into the rear compartments. Shields (not illustrated) are positioned over the connectors 76 to prevent access to the inmates in the rear compartments. The shields are locked over the connectors, and can be removed in the event of an emergency. In one embodiment, member 80 attaches to the access door 75 within the first wall 32. The mount 84 is attached to the access door 75, with the member 80 attached to the mount 84.

Another safety feature is a breakaway locking mechanism 25. As best illustrated in FIG. 2, locking mechanism 25 includes a sliding bar 27 that extends across the exterior doors 20. A lock (not illustrated) is placed within the bar 27 to prevent unauthorized opening. Bar 27 includes a reduced section 28 having a smaller diameter that reduces the amount of force necessary to break the bar. In the event of an emergency and the lock cannot be opened, a force substantially perpendicular to the shaft 27 can be applied to fracture the reduced section 28 to fracture the bar 27 and allow opening of the exterior doors 20. The reduced section 28 is located on the outside of the exterior doors and not accessible to inmates within the unit 10.

The unit 10 may further include additional protection for the inmates in the event of a rollover accident. Guards 118 may be placed over the fasteners and sharp edges of the walls. One embodiment is illustrated in FIG. 1 which includes an elongated panel 118 placed over the hinges and fasteners of the exterior door 20. Likewise, elongated panel 118 is placed over the hinges and fasteners on the third door 37. The guards 118 prevent the inmates from contacting the hinges and fasteners in the event the vehicle 100 was in a rollover accident. Various shapes and sizes of guards 118 may be used within the unit 10.

Figure 7:
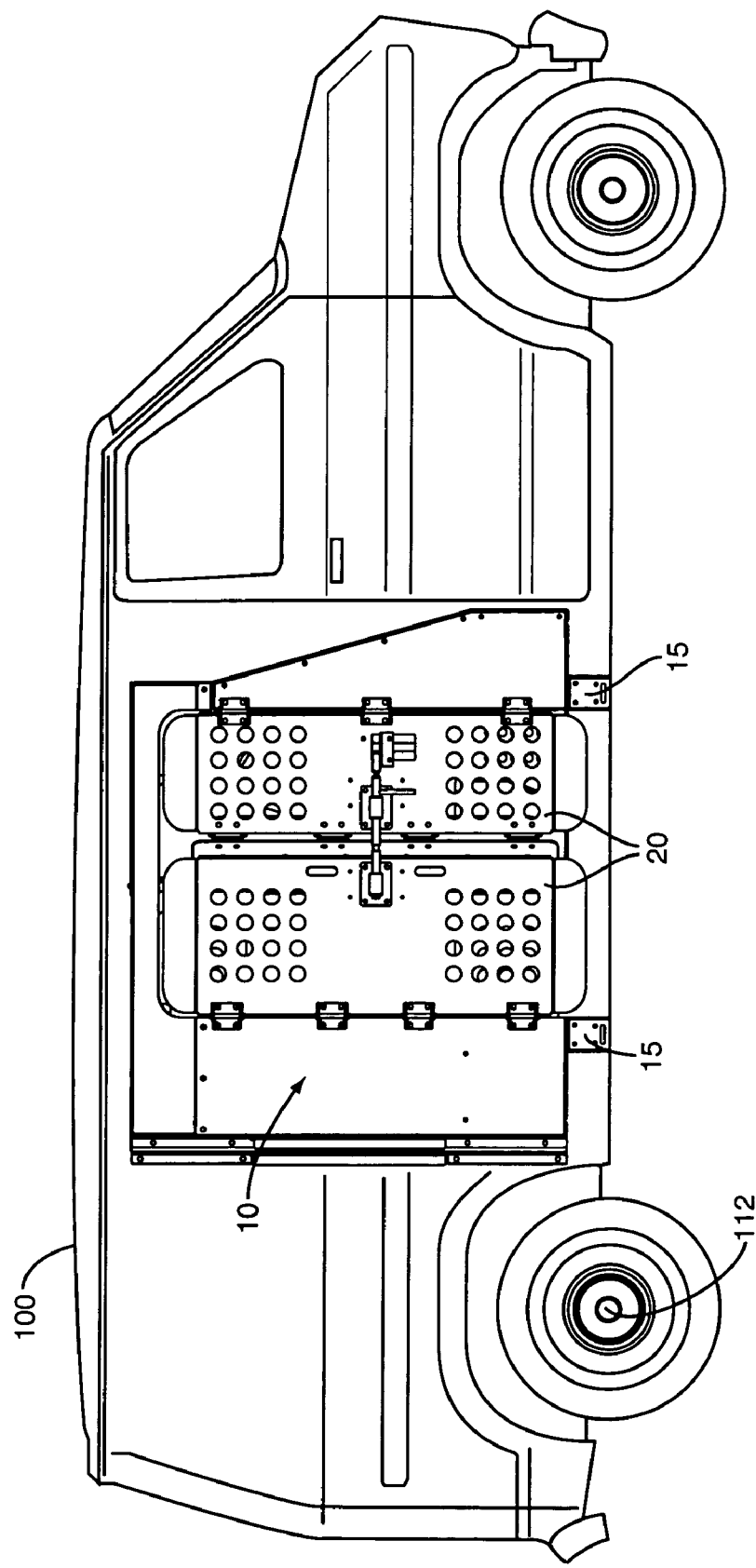
FIG. 7 is a side view of the unit positioned within a vehicle according to one embodiment of the present invention.

FIG. 7 illustrates the unit 10 mounted within a vehicle 100. The unit 10 may be sized to fit within the dimensions of a standard passenger vehicle, such as a cargo van. The unit 10 fits within the confines of the vehicle cargo area. One type of vehicle in which the unit 10 can be mounted is a Chevrolet Express Series 2500 and 3500. Further, the exterior doors 20 may align with side doors on the vehicle providing for straight-forward loading and unloading of the inmates. The unit 10 may further be arranged within the vehicle 100 with an exterior door aligned with a rear vehicle door. The specific installment of the unit 10 within the vehicle is dictated by the vehicle dimensions, and the requirements of the correctional facility. In one embodiment, the center of gravity of the unit 10 is positioned forward of the vehicle rear axle 112 to reduce the chances of a vehicle rollover.

Figure 8:
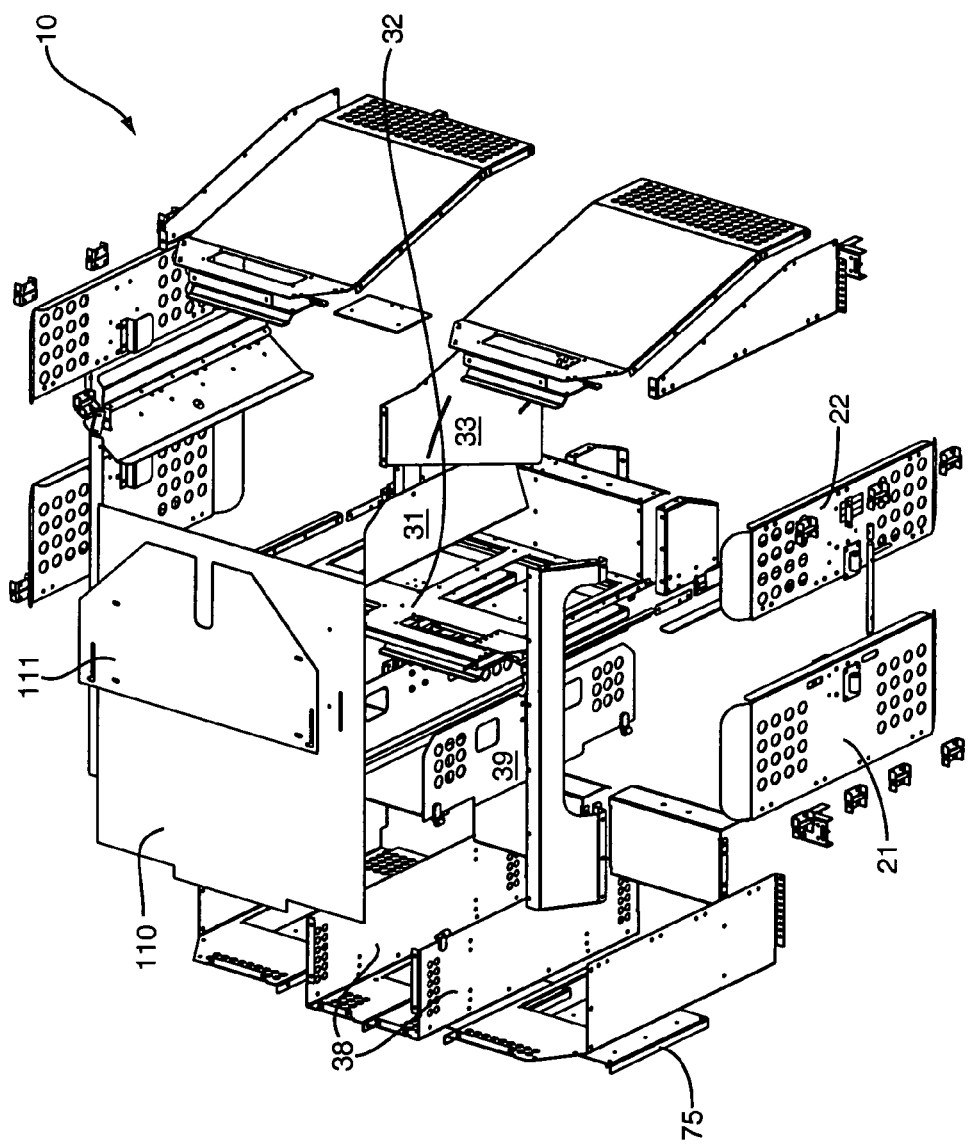
FIG. 8 is an exploded view of one embodiment of the present invention.
Figure 9:
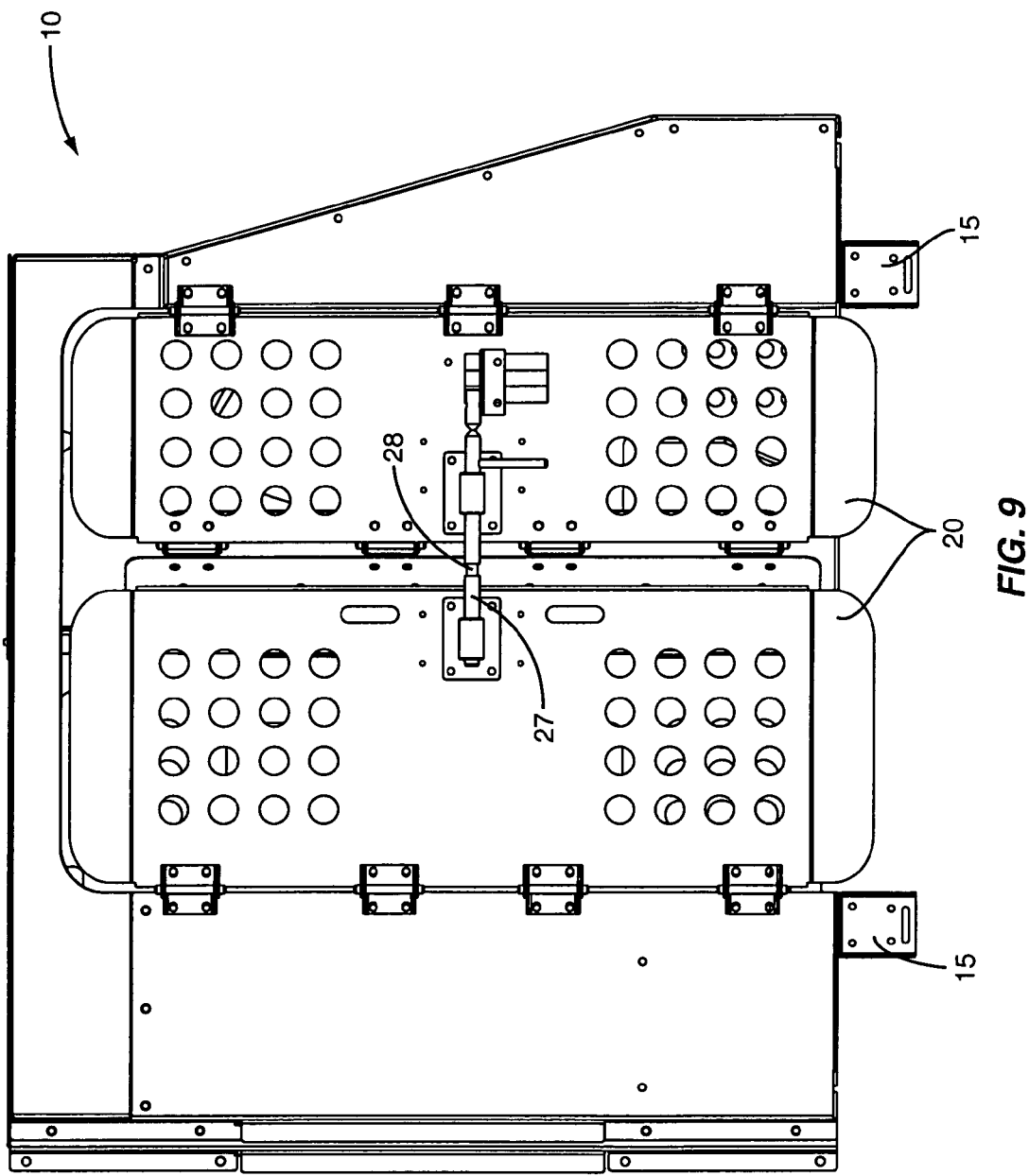
FIG. 9 is a side view of one embodiment of the isolation unit constructed according to one embodiment of the present invention.

FIG. 8 illustrates the unit 10 in an exploded view. Each of the parts are sized to fit within the side doors and rear doors of the vehicle 100 such that the unit 10 can be assembled within the interior of the vehicle 100. One or more mounts 15 may be positioned on the unit 10 for attachment to the interior of the vehicle 100. The unit 10 may include a top section 110 and a bottom section (not illustrated). Alternatively, the top and bottom may not be necessary because the vehicle roof and floor enclose the unit 10 from these directions. In one embodiment illustrated in FIG. 8, the top of the unit 10 includes a top piece 110 and a movable secondary top piece 111. Both the top piece 110 and secondary top piece 111 include slots into which extensions 83 fit from the first wall 34.

Large openings may be placed in the interior and exterior walls 12, 14 to provide viewing into the unit 10. Smaller apertures are placed throughout the interior and exterior walls 12, 14 to assist in viewing, and to allow airflow through the unit 10.

A method of loading and unloading inmates within the unit 10 can be explained in combination with a view of the Figures. FIG. 3 illustrates the unit 10 with the exterior doors 20 open and both third walls 37 in an open configuration (i.e., not attached to the first wall 32). The first wall 32 is in the angled orientation which is the easiest for loading inmates into the rear compartments 50, 60, 70. A first inmate is loaded into the center rear compartment 60 from either of the exterior doors 20. Once inside, both third walls 37 are closed with the member 80 extending across and aligning with the mount 84 on the first wall 32. The member 80 is securely fastened to the mount 84 and the first inmate is secured and isolated within the compartment 60. A second inmate is loaded into compartment 70 through one of the exterior doors 20, and a third inmate is loaded into compartment 50 through another exterior door 20. The first wall 32 may be moved from the angled position to the upright position after the first inmate is loaded, or after all the rear compartments 50, 60, 70 are loaded. The third walls 37 isolate the first inmate from either second or third inmates.

A fourth inmate is loaded through the exterior door into compartment 30. The second inmate (in compartment 70) is isolated from the fourth inmate (entering compartment 30) because the first wall 32 is in the upright position. Likewise, a fifth inmate is loaded into compartment 40 and is isolated from the inmate in compartment 50 by the upright first wall 32. The second wall 34 isolates the inmates that were just loaded in compartments 30, and 40. The exterior doors 20 are closed and the locked thus securing the inmates within the unit 10.

Unloading the inmates substantially reverses the loading procedure. The inmates in the front compartments 30, 40 may be unloaded first and then the first wall 32 moved to the angled orientation to facilitate unloading the inmates in the rear compartments 50, 60, 70. As with loading, each of the inmates is isolated during the unloading procedure.

The embodiment illustrated includes five separate isolation units 30, 40, 50, 60, 70. Various sizes and numbers of compartments 19 may be included within the unit 10 depending upon the needs of the correction facility. One embodiment illustrates the second wall 34 and third wall 37 being substantially perpendicular to the first wall 32. Various numbers of first walls 32, second walls 34, and third walls 37 may be positioned within the unit to size the compartments 19 as needed.

In one embodiment, once an inmate is loaded in side rear compartments 50, 70, first section 21 of the exterior door 20 may be closed and secured. This further isolates the inmates in these compartments 50, 70 and ensures no contact when subsequently loading inmates into the front compartments 30, 40.

The unit 10 has been described in the context of fitting within a vehicle for transporting inmates. Other uses of the cell 10 are also available as necessary. Additionally, the cell 10 can be used independent of a vehicle, such as for a temporary holding cell.

The term "isolate" and the like is used throughout the invention to describe enclosing the inmates such that they are prevented from injuring others. The compartments are constructed to enclose the inmate and restrict movement. Despite that the inmates may be able to contact each other, the contact is limited to minimal amounts such as sticking fingers through the various apertures within the walls. This contact is not enough to inflict injury to another, and the inmate is still considered to be isolated from the others.

The present invention may be carried out in other specific ways than those herein set forth without departing from the scope and essential characteristics of the invention. A lock 86 is disclosed as connected the member 80 to the mount 84, however, various other objects may be used for connection. In one embodiment, seats are positioned within the compartments 19 for the inmates to sit. The present embodiments are, therefore, to be considered in all respects as illustrative and not restrictive, and all changes coming within the meaning and equivalency range of the appended claims are intended to be embraced therein.

What is claimed is:

1. An isolation unit for a vehicle comprising:
   an exterior wall forming an enclosed cell;
   a first interior wall positioned to extend across the cell into a first section and a second section, the first interior wall being adjustable between a first position and a second position;
   a second interior wall positioned within the first section between the exterior wall and the first interior wall to extend across the first section into isolated first and second compartments, the second interior wall being movable to remain intact and divide the first section when the first interior wall is at the first position and the second position;
   a third interior wall positioned between the exterior wall and the first interior wall to extend across the second section; and
   a member mounted between the third interior wall and the first interior wall, the member being movably mounted to the third interior wall and positionable between an extended position and a retracted position to maintain a division within the second section, the member moving between the extended and retracted positions when the first interior wall moves between the first and second positions.

2. The unit of claim 1, wherein the exterior wall comprises a plurality of individual sections that are connected together.

3. The unit of claim 1, wherein the exterior wall comprises at least two exterior doors positioned on opposite sides of the cell to provide access to the first and second sections.

4. The unit of claim 1, further comprising an access door extending through the exterior wall to provide access into the cell.

5. The unit of claim 1, wherein the first interior wall is pivotally positioned within the cell and wherein the first position is upright relative to the exterior wall, and the second position is angled relative to the exterior wall.

6. The unit of claim 3, wherein the exterior doors comprise an extension that attaches to the first interior wall when the exterior doors are in a closed orientation to further divide the first section and the second section.

7. The unit of claim 3, further comprising a locking mechanism on each exterior door, the locking mechanism including a breakaway section having a small strength threshold to be broken in the case of an emergency to move the locking mechanism from a locked position to an open position.

8. The unit of claim 1, wherein the cell comprises five compartments formed by the first interior wall, the second interior wall, and the third interior wall.

9. The unit of claim 1, wherein the second interior wall includes a first section and a second section each having a substantially flat orientation that overlap when moving the first interior wall from the first position to the second position.

10. The unit of claim 1, wherein the third interior wall includes a rigid first section and a movable second section.

11. An isolation unit for a vehicle comprising:
    a plurality of exterior walls forming a cell;
    a first interior wall positioned to extend within the cell and form first and second sections, the first interior wall being movable within the cell between a first orientation and a second orientation;
    a second interior wall positioned within the first section and being substantially perpendicular to the first interior wall, the second interior wall being connected to the first interior wall;
    a third interior wall positioned within the second section and being substantially perpendicular to the first interior wall, the third interior wall having an inner edge that is adjacent to the first interior wall when the first interior wall is in the first orientation; and
    an extension movably extending from the inner edge and being connected to the first interior wall, the extension being movable between a first distance from the inner edge when the first interior wall is in the first orientation, and a second distance from the inner edge when the first interior wall is in the second orientation, the first distance being smaller than the second distance.

12. An isolation unit for a vehicle comprising:
a first compartment formed by an exterior wall, a first interior wall, and a second interior wall;
a second compartment formed by the exterior wall, the first interior wall, and the second interior wall, the second compartment being isolated from the first compartment;
a third compartment formed by the exterior wall, the first interior wall, and a third interior wall, the third compartment being isolated from the first compartment and the second compartment;
a fourth compartment formed by the exterior wall, the first interior wall, and the third interior wall, the fourth compartment being isolated from the first compartment, the second compartment, and the third compartment; and
the first interior wall being movable between a first position and a second position;
each of the second and third interior walls having an adjustable length to maintain connection with the first interior wall during movement between the first position and the second position.

13. The unit of claim 12, wherein the exterior wall comprises a plurality of individual sections connected together.

14. The unit of claim 12, wherein the second and third interior walls are substantially perpendicular to the first interior wall.

15. The unit of claim 12, further comprising a fifth compartment formed by the exterior wall, the first interior wall, and the third interior wall, the fifth compartment being isolated from the first compartment, the second compartment, the third compartment and the fourth compartment.

16. An isolation unit mounted within a vehicle, the vehicle comprising a cargo area, and first and second side doors that open into the cargo area, the isolation unit comprising:
an exterior wall forming a cell positioned within the cargo area of the vehicle;
a first exterior door and a second exterior door within the exterior wall to provide access to the cell, the first exterior door being aligned with the first side door of the vehicle, and the second exterior door being aligned with the second side door of the vehicle;
a first compartment formed by the exterior wall, a first interior wall, and a second interior wall;
a second compartment formed by the exterior wall, the first interior wall, and the second interior wall, the second compartment being isolated from the first compartment;
a third compartment formed by the exterior wall, the first interior wall, and a third interior wall, the third compartment being isolated from the first compartment and the second compartment;
a fourth compartment formed by the exterior wall, the first interior wall, and the third interior wall, the fourth compartment being isolated from the first compartment, the second compartment, and the third compartment;
a fifth compartment formed by the exterior wall, the first interior wall, and the third interior wall, the fifth compartment being isolated from the first compartment, the second compartment, the third compartment and the fourth compartment;
the first interior wall being movable between a first position and a second position;
each of the second and third interior walls having an adjustable length to maintain connection with the first interior wall during movement between the first position and the second position.

17. The unit of claim 16, wherein the first exterior door opens into two of the first, second, third, fourth, and fifth compartments.

18. The unit of claim 16, wherein the second exterior door opens into two of the first, second, third, fourth, and fifth compartments.

19. A method of isolating inmates within a cell for transportation, the method comprising the steps of:
moving a first interior wall from a first position to a second position;
placing a first inmate in a first compartment;
locking a third interior wall to the first interior wall and enclosing the first inmate within the first compartment;
placing a second inmate in a second compartment;
moving the first interior wall from the second position to the first position and enclosing the second inmate in the second compartment formed by the first interior wall, the third interior wall, and the exterior wall;
enclosing a third inmate in a third compartment that is formed by the exterior wall, the first interior wall, and a second interior wall; and
enclosing a fourth inmate in a fourth compartment that is formed by the exterior wall, the first interior wall, and the second interior wall.

20. The method of claim 19, further comprising closing exterior doors and completely enclosing the first, second, third, and fourth compartments.

21. The method of claim 19, further comprising enclosing a fifth inmate in a fifth compartment that is formed between the first compartment and the second compartment.

22. The method of claim 19, wherein the step of moving the first interior wall from the first position to the second position comprises moving the first interior wall from an angled position to an upright position.

23. The method of claim 19, wherein the step of moving the first interior wall from the first position to the second position reduces the volume of the first and second compartments.

* * * * *